United States Patent
Imai et al.

(10) Patent No.: US 12,512,910 B2
(45) Date of Patent: Dec. 30, 2025

(54) OPTICAL COMMUNICATION DEVICE AND OPTICAL COMMUNICATION METHOD

(71) Applicant: NTT, Inc., Tokyo (JP)

(72) Inventors: Takeshi Imai, Musashino (JP); Junichi Kani, Musashino (JP); Shin Kaneko, Musashino (JP); Naotaka Shibata, Musashino (JP); Rintaro Harada, Musashino (JP)

(73) Assignee: NTT, Inc., Tokyo (JP)

(*) Notice: Subject to any disclaimer, the term of this patent is extended or adjusted under 35 U.S.C. 154(b) by 273 days.

(21) Appl. No.: 18/039,425

(22) PCT Filed: Dec. 2, 2020

(86) PCT No.: PCT/JP2020/044888
§ 371 (c)(1),
(2) Date: May 30, 2023

(87) PCT Pub. No.: WO2022/118402
PCT Pub. Date: Jun. 9, 2022

(65) Prior Publication Data
US 2023/0421257 A1    Dec. 28, 2023

(51) Int. Cl.
*H04B 10/112*    (2013.01)
*H04B 10/50*    (2013.01)
*H04B 10/60*    (2013.01)

(52) U.S. Cl.
CPC ......... *H04B 10/112* (2013.01); *H04B 10/503* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,627,669 | A * | 5/1997 | Orino | H04B 10/118 398/129 |
| 6,243,182 | B1 * | 6/2001 | Wang | H04B 10/1121 398/119 |
| 6,775,480 | B1 * | 8/2004 | Goodwill | H04B 10/11 398/151 |
| 8,305,252 | B2 * | 11/2012 | Bradley | G01S 7/495 342/13 |
| 2002/0059042 | A1 * | 5/2002 | Kacyra | G01B 11/24 702/152 |
| 2007/0031151 | A1 * | 2/2007 | Cunningham | H04B 10/1123 398/131 |

(Continued)

FOREIGN PATENT DOCUMENTS

| | | |
|---|---|---|
| JP | H5-346467 A | 12/1993 |
| JP | H8-167875 A | 6/1996 |

(Continued)

*Primary Examiner* — Darren E Wolf
(74) *Attorney, Agent, or Firm* — Harness, Dickey & Pierce, P.L.C.

(57) ABSTRACT

An optical transmitter (3) tracks a moving body (1) and irradiates the moving body (1) with a laser beam (4). An optical receiver (5) is mounted on the moving body (1), receives the laser beam (4), and performs optical space communication with the optical transmitter (3). The optical transmitter (3) extends an irradiation range (6) of the laser beam (4) into an elliptical shape.

10 Claims, 9 Drawing Sheets

(56) References Cited

U.S. PATENT DOCUMENTS

| 2008/0174864 A1* | 7/2008 | Tanaka | G02B 27/0944 |
| | | | 359/432 |
| 2008/0212960 A1* | 9/2008 | Lundquist | G01J 3/10 |
| | | | 398/25 |
| 2014/0072302 A1* | 3/2014 | Iwama | G02B 6/356 |
| | | | 398/48 |

FOREIGN PATENT DOCUMENTS

| JP | 2002-131691 A | 5/2002 |
| JP | 2005-229253 A | 8/2005 |
| JP | 2015-207934 A | 11/2015 |

* cited by examiner

OPTICAL COMMUNICATION DEVICE AND OPTICAL COMMUNICATION METHOD

CROSS-REFERENCE TO RELATED APPLICATIONS

This application is a 371 U.S. National Phase of International Application No. PCT/JP2020/044888, filed on Dec. 2, 2020. The entire disclosure of the above application is incorporated herein by reference.

TECHNICAL FIELD

The present disclosure relates to an optical communication device and an optical communication method.

BACKGROUND ART

In optical space communication, a moving body on which an optical receiver is mounted is tracked, and the moving body is irradiated with a laser beam from an optical transmitter. Since an irradiation range of the laser beam is generally narrow with respect to a movement range of the moving body, tracking is difficult even if the laser beam is moved and scanned in a planar manner. Conventionally, by controlling a divergence angle of the laser beam, the optical receiver is easily irradiated with the laser beam (see, for example, Patent Literature 1).

CITATION LIST

Patent Literature

Patent Literature 1: JP 2005-229253 A

SUMMARY OF THE INVENTION

Technical Problem

Conventionally, since the irradiation range of the laser beam is expanded while being circular, it is inefficient when the magnitude of movement of the moving body in the vertical direction and the horizontal direction is different. For example, in a case where the movement of the moving body in the horizontal direction is large, if the circular irradiation range is matched with the magnitude of the movement in the vertical direction, the irradiation range is insufficient in the horizontal direction, and if the irradiation range is matched with the magnitude of the movement in the horizontal direction, the irradiation range is excessive in the vertical direction. Excessive expansion of the laser beam should be avoided because expansion the laser beam reduces the received light power at the optical receiver.

The present disclosure has been made to solve the above-described problems, and an object thereof is to obtain an optical communication device and an optical communication method capable of efficiently irradiating an optical receiver with a laser beam.

Means for Solving the Problem

An optical communication device according to the present disclosure includes: an optical transmitter that tracks a moving body and irradiates the moving body with a laser beam; and an optical receiver that is mounted on the moving body, receives the laser beam, and performs optical space communication with the optical transmitter, in which the optical transmitter extends an irradiation range of the laser beam into an elliptical shape.

Effects of the Invention

In the present disclosure, the optical transmitter extends the irradiation range of the laser beam into an elliptical shape. This makes it possible to efficiently irradiate the optical receiver with the laser beam even in a case where the magnitude of movement of the moving body in the vertical direction is different from the magnitude of movement of the moving body in the horizontal direction. Therefore, tracking by the optical transmitter is simplified, and light reception of the laser beam by the optical receiver is facilitated. Also, by not extending the irradiation range in a direction other than the moving direction of the moving body, it is possible to suppress a decrease in received light power in the optical receiver.

DESCRIPTION OF EMBODIMENTS

Figure 1:
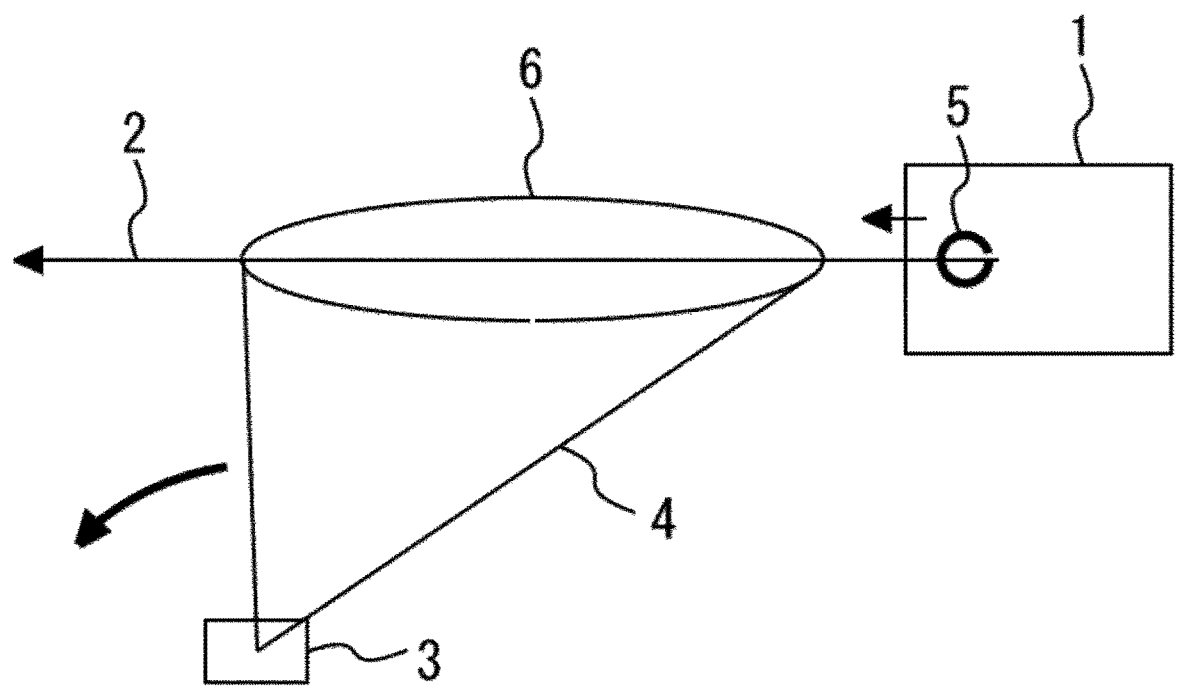
FIG. 1 is a schematic diagram illustrating an optical communication device according to a first embodiment.

An optical communication device and an optical communication method according to embodiments will be described with reference to the drawings. The same or corresponding components are denoted by the same reference numerals, and repetition of the description may be omitted.

First Embodiment

FIG. 1 is a schematic diagram illustrating an optical communication device according to a first embodiment. Since a moving body 1 moves on a railway track or a road, a trajectory 2 of the moving body 1 can be predicted in advance. An optical transmitter 3 tracks the moving body 1 and irradiates the moving body 1 with a laser beam 4. The laser beam 4 is an optical signal modulated on the basis of a communication signal. An optical receiver 5 is mounted on the moving body 1 and moves together with the moving body 1. The optical receiver 5 receives the laser beam 4 and performs optical space communication with the optical transmitter 3.

The optical transmitter 3 extends an irradiation range 6 of the laser beam 4 into an elliptical shape. That is, the irradiation range 6 has an elliptical shape in a plane perpendicular to the irradiation direction of the laser beam 4. The major axis of the elliptical shape of the irradiation range 6 is aligned with the moving direction of the moving body 1. Here, the irradiation range 6 of the laser beam 4 is extended in the direction of the trajectory 2 of the moving body 1. In this case, the elliptical major axis of the irradiation range 6 exists on the plane including the trajectory 2 of the moving body 1 and the optical transmitter 3.

Figure 2:
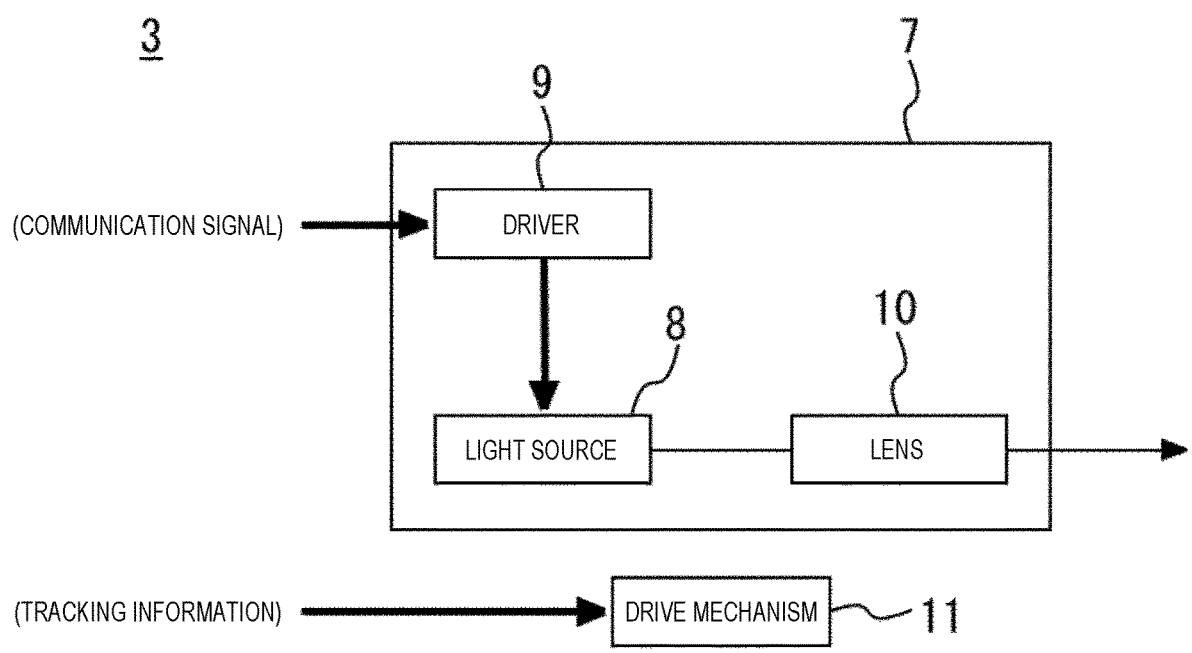
FIG. 2 is a block diagram illustrating an optical transmitter according to the first embodiment.

FIG. 2 is a block diagram illustrating the optical transmitter according to the first embodiment. A laser light source 8, a driver 9, and a lens 10 are provided in a transmitter main body 7. The laser light source 8 is a laser that emits the laser beam 4. The driver 9 modulates the laser beam 4 on the basis of the communication signal input to the optical transmitter 3 to generate an optical signal. The lens 10 refracts the modulated laser beam 4. A drive mechanism 11 changes the direction of a transmitter main body 7 on the basis of given tracking information, controls the irradiation direction of the laser beam 4, and tracks the moving body 1.

Figure 3:
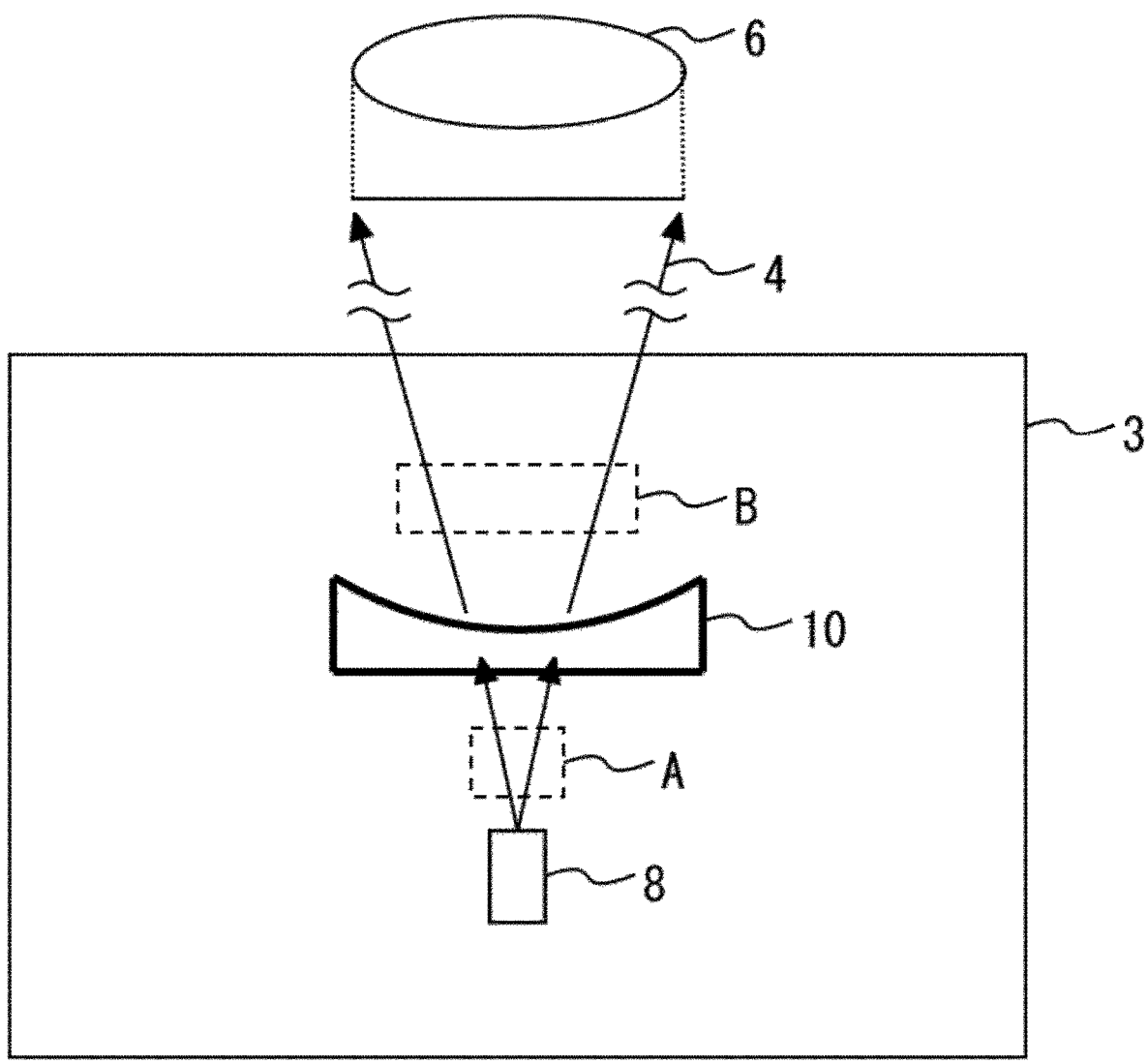
FIG. 3 is a schematic diagram illustrating the optical transmitter according to the first embodiment.

FIG. 3 is a schematic diagram illustrating the optical transmitter according to the first embodiment. The lens 10 is a cylindrical concave lens having a generatrix in a direction orthogonal to the paper surface, and does not have a function of expanding a divergence angle of a beam in a lateral direction of the paper surface and refracting the beam in the direction orthogonal to the paper surface. Note that the lens 10 can rotate with a vertical direction with respect to the paper surface as an axis.

When the laser beam 4 having a certain divergence angle is incident on the lens 10 on the upper side of the drawing from the laser light source 8 on the lower side of the drawing, the laser beam 4 is widened in the lateral direction of the paper surface by the lens 10. Since the lens 10 does not act in the direction orthogonal to the paper surface, the laser beam 4 propagates while maintaining the original divergence angle.

The lens 10 is rotated to adjust the major axis of the ellipse in the irradiation range 6 of the laser beam 4 to match the trajectory 2 of the moving body 1. Accordingly, the irradiation range 6 of the laser beam 4 can be extended in the direction of the trajectory 2 of the moving body 1.

For example, when the laser beam 4 having an optical wavelength of 1.55 µm and a beam waist radius of 0.25 mm is incident on a cylindrical lens having a focal length of 25 mm, the major axis of the ellipse of the irradiation range 6 of the laser beam 4 extends to 2 m at 100 m ahead.

Note that a lens acting in a direction orthogonal to the lens 10 may be separately inserted into one or both of a position A and a position B. With this lens, the divergence angle of the laser beam 4 in the direction orthogonal to the lens 10 can be adjusted. In addition, although one cylindrical lens is illustrated for simplicity, a plurality of lenses may be combined. In addition, the lens 10 is not limited to a concave lens, and a convex lens that similarly has a function of expanding a beam may be used.

Figure 4:
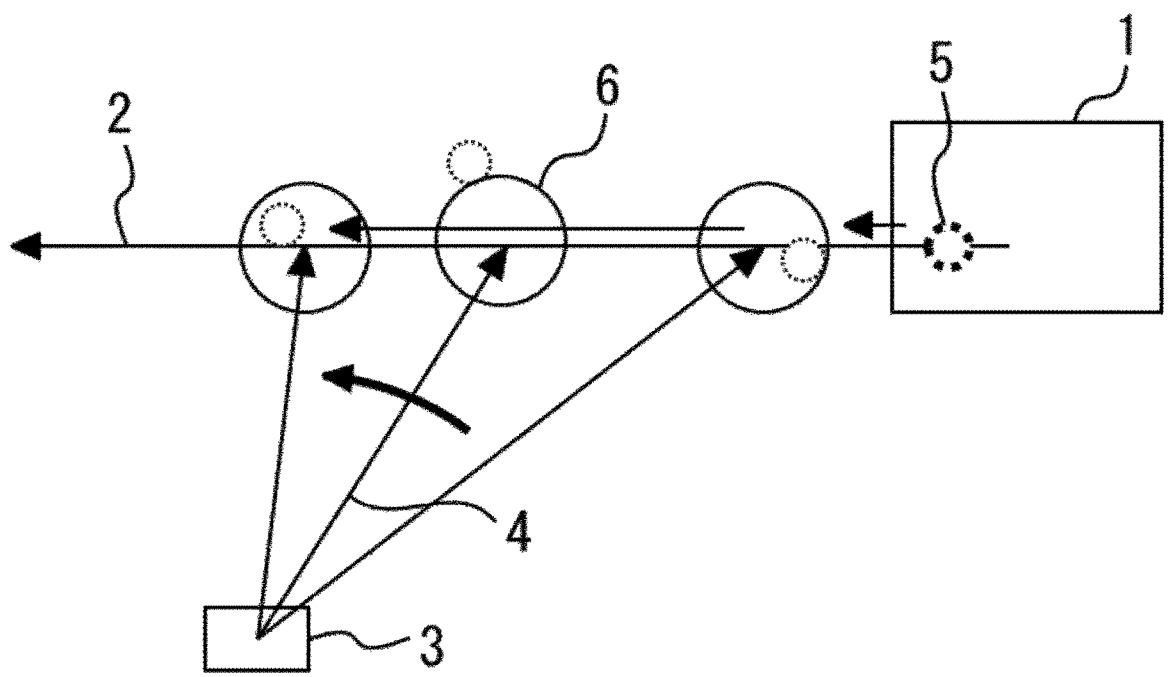
FIG. 4 is a schematic diagram illustrating an optical communication device according to a comparative example.

Next, effects of the present embodiment will be described in comparison with a comparative example. FIG. 4 is a schematic diagram illustrating an optical communication device according to a comparative example. In the comparative example, the irradiation range 6 of the laser beam 4 is circular. The movement of the optical receiver 5 mounted on the moving body 1 is indicated by a broken line circle. The moving body 1 moves slightly up and down along the trajectory 2. Therefore, the optical receiver 5 similarly moves along the trajectory 2 while moving up and down. For example, when the laser beam 4 has a wavelength of 1.55 µm and a beam waist radius of 0.25 mm, the irradiation range 6 is a circle having a diameter of 40 cm at 100 m ahead. If the magnitude of the circle of the irradiation range 6 is matched with the magnitude of the movement of the moving body 1 in the vertical direction, the irradiation range is insufficient in the horizontal direction, and if the magnitude of the circle of the irradiation range is matched with the magnitude of the movement in the horizontal direction, the irradiation range is excessive in the vertical direction.

On the other hand, in the present embodiment, the optical transmitter 3 extends the irradiation range 6 of the laser beam 4 into an elliptical shape. This makes it possible to efficiently irradiate the optical receiver 5 with the laser beam 4 even in a case where the magnitude of movement of the moving body 1 in the vertical direction is different from the magnitude of movement of the moving body 1 in the horizontal direction. Therefore, tracking by the optical transmitter 3 is simplified, and light reception of the laser beam 4 by the optical receiver 5 is facilitated. Also, by not extending the irradiation range in a direction other than the moving direction of the moving body 1, it is possible to suppress a decrease in received light power in the optical receiver 5.

Further, the irradiation range 6 of the laser beam 4 is extended in the direction of the trajectory 2 of the moving body 1. Accordingly, the optical receiver 5 can be efficiently irradiated with the laser beam 4 in accordance with the movement of the moving body 1 in the direction of the trajectory 2.

Figure 5:
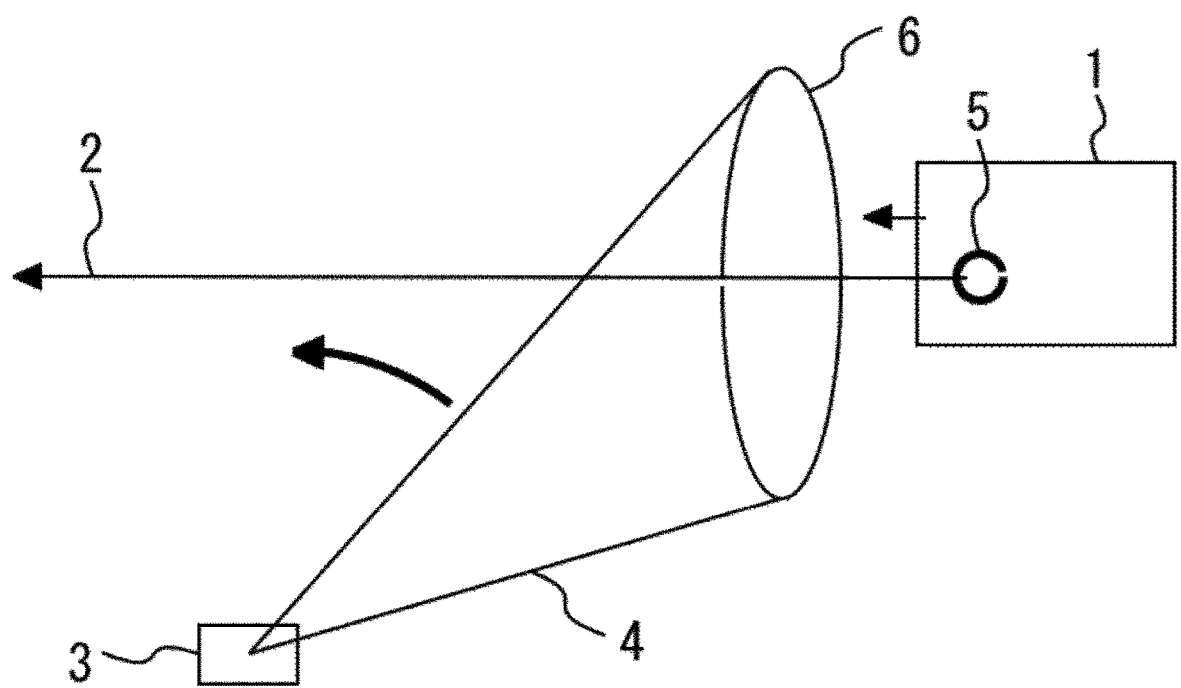
FIG. 5 is a schematic diagram illustrating a modification of the optical communication device according to the first embodiment.

FIG. 5 is a schematic diagram illustrating a modification of the optical communication device according to the first embodiment. The irradiation range 6 of the laser beam 4 is extended in the direction orthogonal to the trajectory 2 of the moving body 1. Accordingly, the optical receiver 5 can be efficiently irradiated with the laser beam 4 in accordance with the movement of the moving body 1 in the vertical direction orthogonal to the trajectory 2.

Second Embodiment

Figure 6:
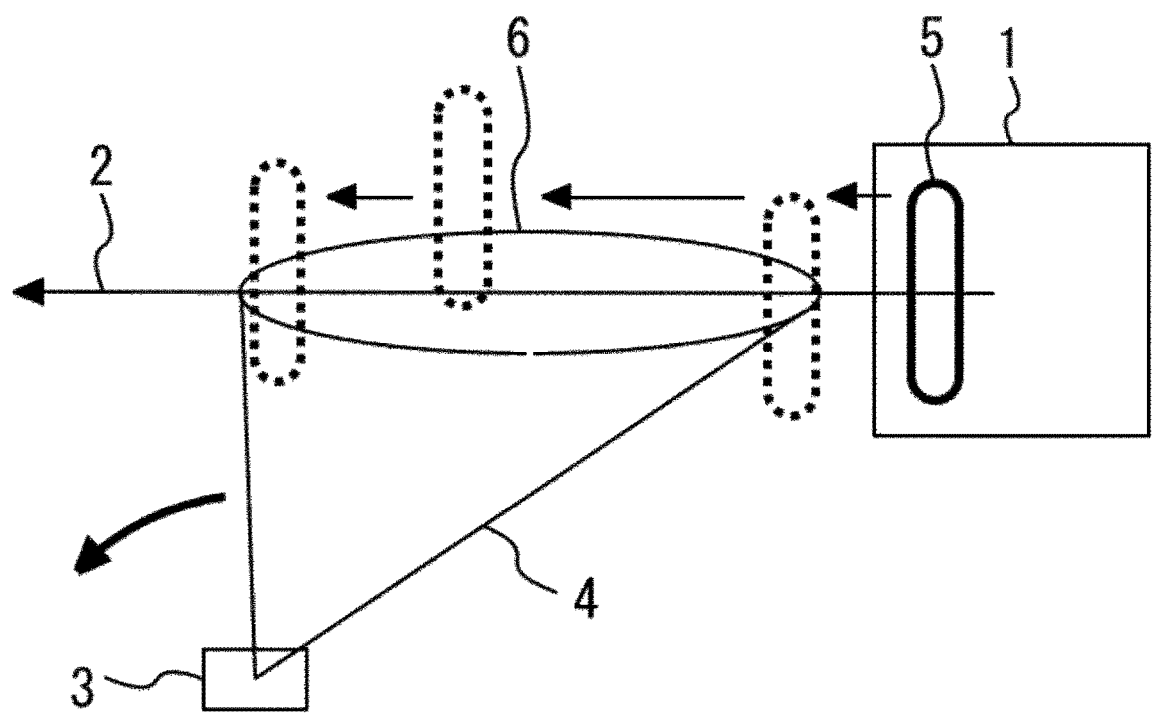
FIG. 6 is a schematic diagram illustrating an optical communication device according to a second embodiment.

FIG. 6 is a schematic diagram illustrating an optical communication device according to a second embodiment. Since the irradiation range 6 of the laser beam 4 is extended in the direction of the trajectory 2 of the moving body 1, tracking by the optical transmitter 3 is simplified. In addition, the light receiving range of the optical receiver 5 is extended in the vertical direction orthogonal to the trajectory 2. Accordingly, even when the moving body 1 on which the optical receiver 5 is mounted slightly moves in the vertical direction, light reception of the laser beam 4 by the optical receiver 5 is facilitated. For example, the light receiving range of the optical receiver 5 can be extended by expanding the light receiving diameter of the optical receiver 5 using a cylindrical lens. Alternatively, it is also possible to extend the light receiving range of the optical receiver 5 by linearly arranging a plurality of optical receivers and combining their outputs.

Figure 7:
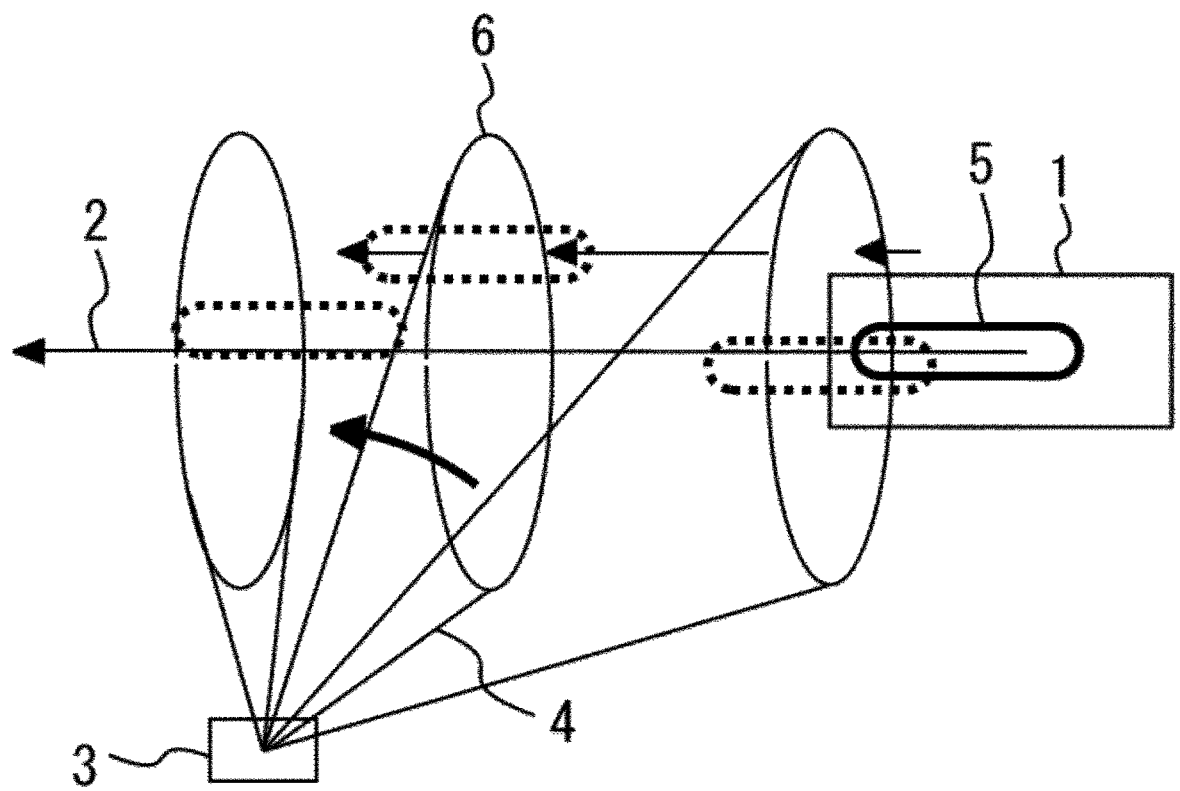
FIG. 7 is a schematic diagram illustrating a modification of the optical communication device according to the second embodiment.

FIG. 7 is a schematic diagram illustrating a modification of the optical communication device according to the second embodiment. The irradiation range 6 of the laser beam 4 is extended in the vertical direction orthogonal to the trajectory 2 of the moving body 1, and the light receiving range of the optical receiver 5 is extended in the direction of the trajectory 2.

In either case of FIGS. 6 and 7, the light receiving range of the optical receiver 5 is extended in a direction orthogonal to the direction in which the irradiation range 6 of the laser beam 4 is extended. Accordingly, even when the moving body 1 on which the optical receiver 5 is mounted moves slightly in the vertical direction while moving in the horizontal direction, light reception of the laser beam 4 by the optical receiver 5 is facilitated.

Third Embodiment

Figure 8:
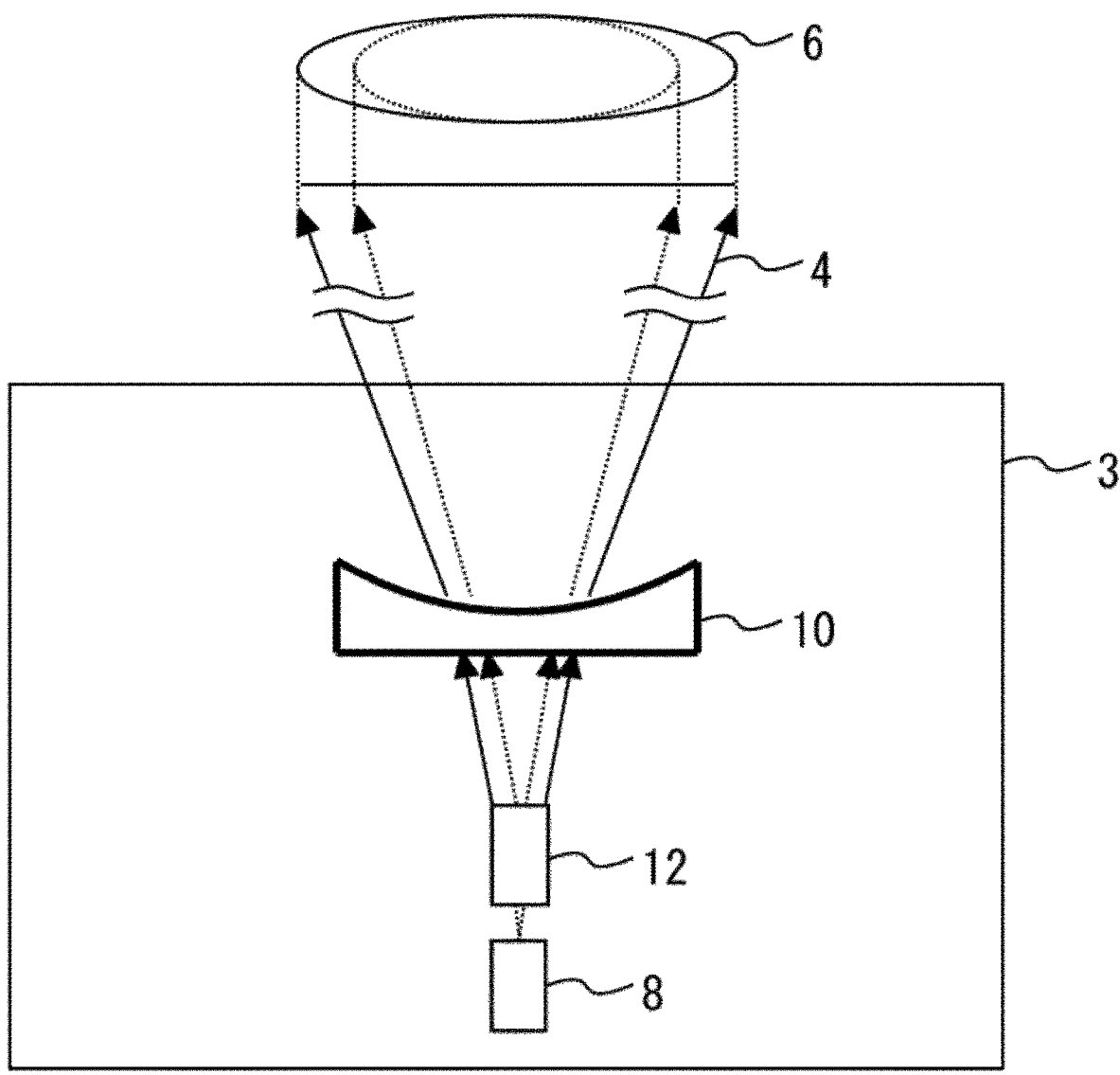
FIG. 8 is a schematic diagram illustrating an optical transmitter according to a third embodiment.

FIG. 8 is a schematic diagram illustrating an optical transmitter according to a third embodiment. The optical transmitter 3 includes an optical mechanism 12 such as a beam expander that adjusts the beam waist of the laser beam 4 emitted from the laser light source 8. The irradiation range 6 of the laser beam 4 can be adjusted by adjusting the beam waist. For example, when the radius of the beam waist is increased to 0.5 mm under the same conditions as in the first embodiment, the irradiation range 6 of the laser beam 4 at 100 m ahead is an ellipse having a minor axis of 20 cm in diameter and a major axis of 4 m across.

According to the present embodiment, not only can the irradiation range 6 of the laser beam 4 be extended in a desired direction, but the irradiation range 6 of the laser beam 4 can also be individually set to an optimum range.

Fourth Embodiment

Figure 9:
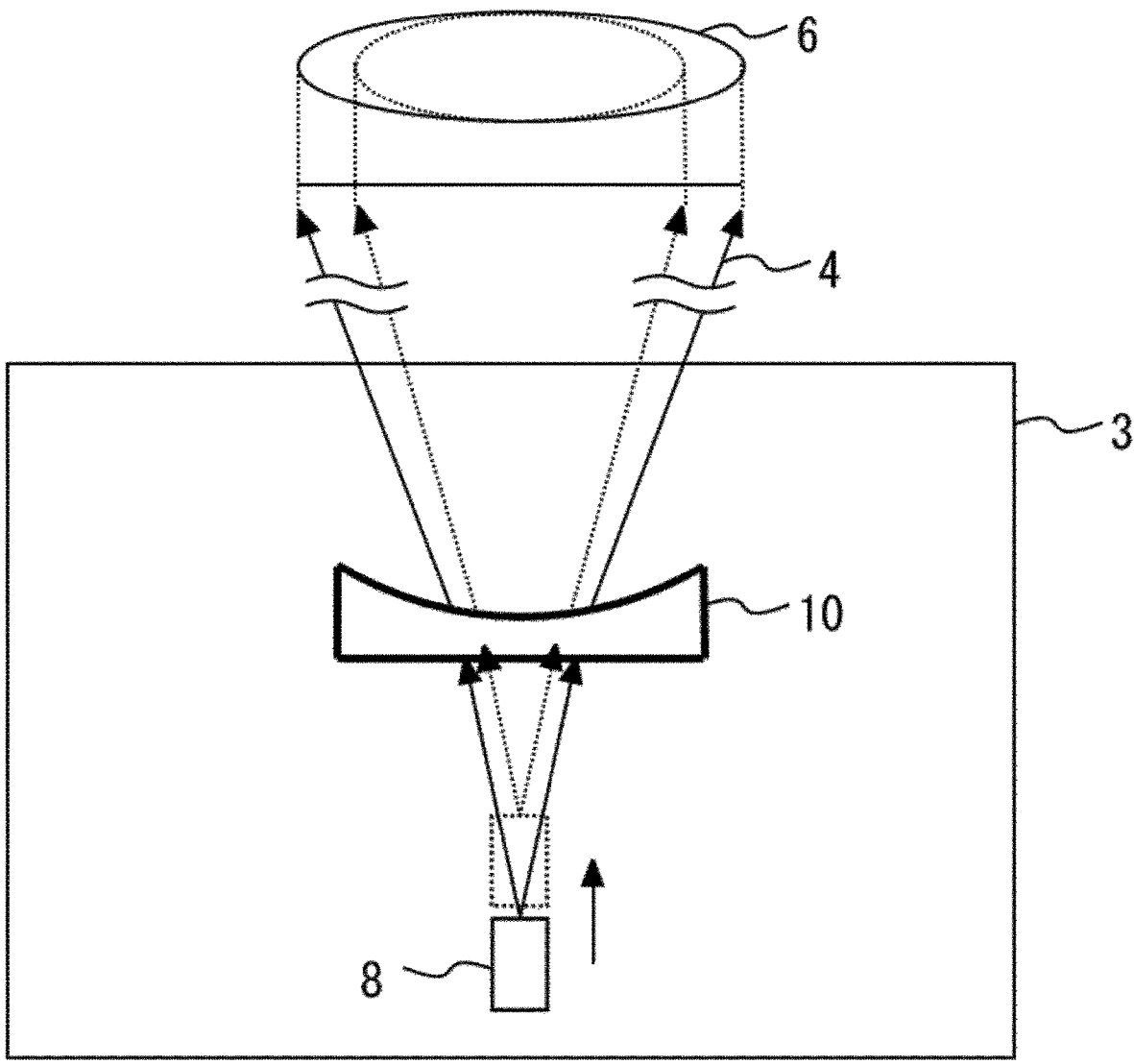
FIG. 9 is a schematic diagram illustrating an optical transmitter according to a fourth embodiment.

FIG. 9 is a schematic diagram illustrating an optical transmitter according to a fourth embodiment. The optical transmitter 3 adjusts the irradiation range 6 of the laser beam 4 by adjusting an interval between the laser light source 8 and the lens 10 by mechanical means such as a linear motion stage (not illustrated).

For example, it is assumed that the lens 10 is a cylindrical lens having a focal length of 25 mm, the laser light source 8 is an optical fiber that outputs the laser beam 4, and the beam waist has a radius of 25 μm having a magnitude corresponding thereto. When the laser beam 4 having an optical wavelength of 1.55 μm is incident on the lens from the focal position, the irradiation range 6 of the laser beam 4 at 100 m ahead is an ellipse having a major axis of about 8 m across. When the laser light source 8 is brought 5 mm closer to the lens 10 from the focal position, the irradiation range 6 of the laser beam is an ellipse having a major axis of 7 m across.

According to the present embodiment, not only can the irradiation range 6 of the laser beam 4 be extended in a desired direction, but the irradiation range 6 of the laser beam 4 can also be individually set to an optimum range by mechanical means without using an optical mechanism.

REFERENCE SIGNS LIST

1 Moving body
3 Optical transmitter
4 Laser beam
5 Optical receiver
6 Irradiation range
8 Laser light source
9 Driver
10 Lens
12 Optical mechanism

The invention claimed is:

1. An optical communication device comprising:
an optical transmitter that tracks a moving body and irradiates the moving body with a laser beam; and
an optical receiver that is mounted on the moving body, receives the laser beam, and performs optical space communication with the optical transmitter,
wherein the optical transmitter extends an irradiation range of the laser beam into an elliptical shape in a vertical direction orthogonal to a trajectory of the moving body,
a light receiving range of the optical receiver is extended in a direction orthogonal to a direction in which the irradiation range of the laser beam is extended, and
the light receiving range of the optical receiver is extended by expanding a light receiving diameter of the optical receiver using a cylindrical lens or by linearly arranging a plurality of optical receivers and combining their outputs.

2. An optical communication device comprising:
an optical transmitter that tracks a moving body and irradiates the moving body with a laser beam; and
an optical receiver that is mounted on the moving body, receives the laser beam, and performs optical space communication with the optical transmitter,
wherein the optical transmitter extends the irradiation range of the laser beam in a direction of a trajectory of the moving body,
a light receiving range of the optical receiver is extended in a vertical direction orthogonal to a direction in which the irradiation range of the laser beam is extended, and
the light receiving range of the optical receiver is extended by expanding a light receiving diameter of the optical receiver using a cylindrical lens or by linearly arranging a plurality of optical receivers and combining their outputs.

3. The optical communication device according to claim 1, wherein the optical transmitter includes a laser light source that emits the laser beam, a driver that modulates the laser beam, and a lens that refracts the laser beam.

4. The optical communication device according to claim 3, wherein the optical transmitter includes an optical mechanism that adjusts a beam waist of the laser beam.

5. The optical communication device according to claim 3, wherein the optical transmitter adjusts the irradiation range of the laser beam by adjusting an interval between the laser light source and the lens.

6. The optical communication device according to claim 2, wherein the optical transmitter includes a laser light source that emits the laser beam, a driver that modulates the laser beam, and a lens that refracts the laser beam.

7. The optical communication device according to claim 6, wherein the optical transmitter includes an optical mechanism that adjusts a beam waist of the laser beam.

8. The optical communication device according to claim 6, wherein the optical transmitter adjusts the irradiation range of the laser beam by adjusting an interval between the laser light source and the lens.

9. An optical communication method, comprising the steps of:
tracking a moving body and irradiating the moving body with a laser beam from an optical transmitter; and
receiving the laser beam by an optical receiver mounted on the moving body and performing optical space communication between the optical transmitter and the optical receiver,
wherein an irradiation range of the laser beam emitted from the optical transmitter is extended into an elliptical shape in a vertical direction orthogonal to a trajectory of the moving body, a light receiving range of the optical receiver is extended in a direction orthogonal to a direction in which the irradiation range of the laser beam is extended, and the light receiving range of the optical receiver is extended by expanding a light receiving diameter of the optical receiver using a cylindrical lens or by linearly arranging a plurality of optical receivers and combining their outputs.

10. An optical communication method, comprising the steps of:

tracking a moving body and irradiating the moving body with a laser beam from an optical transmitter; and receiving the laser beam by an optical receiver mounted on the moving body and performing optical space communication between the optical transmitter and the optical receiver, wherein the optical transmitter extends the irradiation range of the laser beam in a direction of a trajectory of the moving body, a light receiving range of the optical receiver is extended in a vertical direction orthogonal to a direction in which the irradiation range of the laser beam is extended, and the light receiving range of the optical receiver is extended by expanding a light receiving diameter of the optical receiver using a cylindrical lens or by linearly arranging a plurality of optical receivers and combining their outputs.

* * * * *